Nov. 17, 1959  G. D. SIEMANTEL  2,913,022
WORK SUPPORTING DEVICE
Filed Nov. 1, 1957
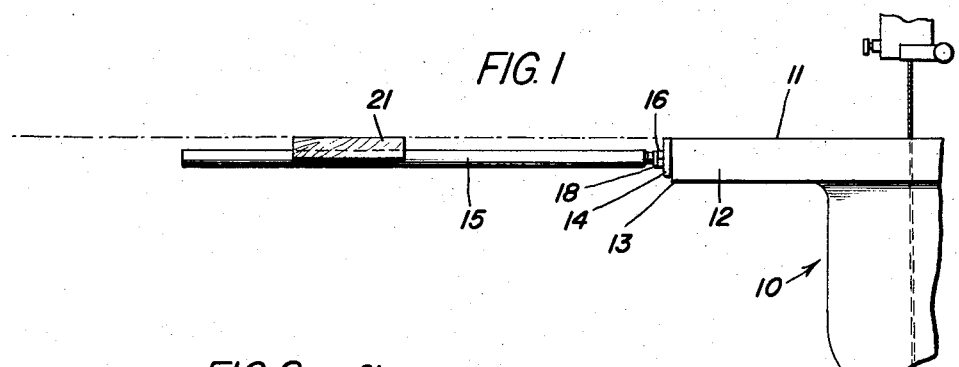
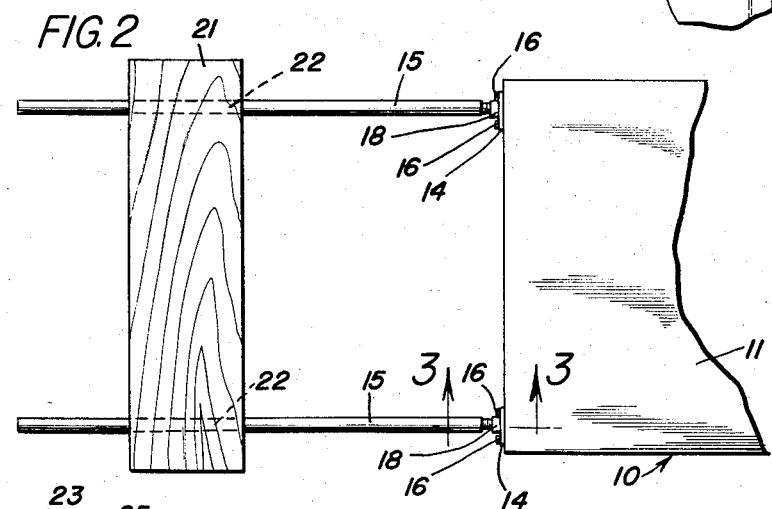
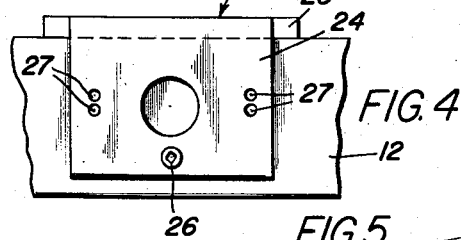
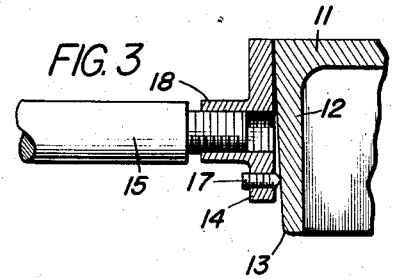
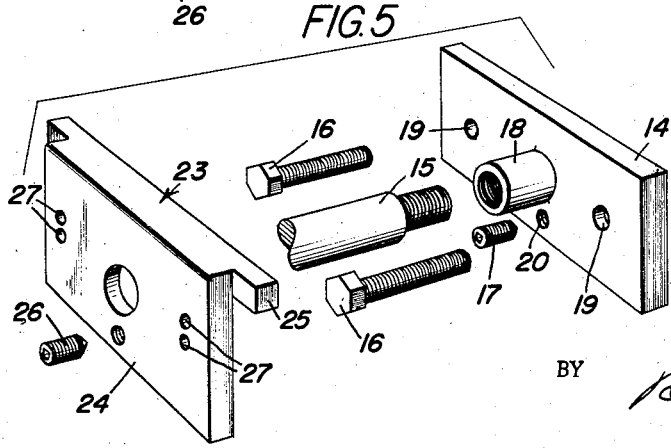
INVENTOR
GEO. D. SIEMANTEL
BY
ATTORNEY

# United States Patent Office 2,913,022
Patented Nov. 17, 1959

2,913,022
WORK SUPPORTING DEVICE
George D. Siemantel, Raton, N. Mex.
Application November 1, 1957, Serial No. 693,925
2 Claims. (Cl. 143—132)

The present invention relates to work supporting holders for power machine tools, and more particularly for power machine tools of relatively small size.

The maximum capacity of any power machine is limited by the size of the machine table for supporting the work. This applies particularly to power machines such as power saws, drill presses, or other machines having table tops for supporting the work and used mostly in small shops; manual training schools, hobby shops and home workshops. There has long been a need for an attachment for power machines to provide increased table space and in recent years table top extensions have been sold as an accessory to power saws. However, these extensions have been more or less complicated and expensive and cannot be used except with a particular saw.

A primary object of the present invention is to provide a supporting extension adapted for universal application to any power machine having a table top for supporting work thereon.

A further object of the invention is to provide machine table extension arms which can be detachably secured to a power machine table enabling the same set of arms to be used for different machines.

A still further object of the invention is to provide table extension arms which can be manufactured at low cost, and which can easily be attached to existing machines by any person using such machines.

Other objects and advantages of the present invention will be apparent to those skilled in the art to which this invention relates by reference to accompanying drawing taken in connection with the following detailed description.

Figure 1 is a side view of a portion of a power machine table with the extension arms secured thereto.

Figure 2 is a top plan view of the construction shown in Figure 1.

Figure 3 is an enlarged sectional view taken on line 3—3 of Figure 2.

Figure 4 is an enlarged front view of a template associated with a table top, and Figure 5 is an enlarged exploded view of the parts used in attaching one of the brackets to a table top.

Referring to the drawing, numeral 10 indicates a machine power tool in the form of a band saw. While I have shown a band saw for purpose of illustration, it will be understood that the invention is applicable to any form of power machine tool having a table working surface. The work supporting table, indicated by numeral 11 is generally formed of metal and has a flange 12 generally formed as a rough casting, tapering downwardly towards its bottom edge 13.

The present invention is associated with machines of the character described above and provides a support for long or wide pieces of lumber or board. The supporting device of the present invention includes a pair of similar brackets 14, a pair of rods 15, four cap screws 16, and two set screws 17.

Practically all table top flanges are approximately 1 5/16" in height and the height of the bracket is preferably made 1¼" in height in order to fit within the confines of the flange. The width of the bracket is approximately 2¼" thus making the length a little less than twice the height. The bracket 14 includes an integral, threaded collar 18, a pair of ¼" openings 19 to receive the cap screws 16, and a single threaded opening 20 to receive the set screw 17.

The work supporting slidable member 21 comprises a piece of board of a length substantially equal to the width of the table with which it is to be used and of a width from 4" to 10", as desired by the operator. The lower surface of the board is provided with grooves 22, properly spaced from each other to receive the rods 15 and slide thereon. The member 21 is of a sufficient thickness whereby the top surface of the board is in the same plane as the top surface of the table top.

In order to properly attach the above described assembly to existing table tops, a templet is provided with each assembly. As seen in Figures 4 and 5, the templet 23 comprises a plate 24 of approximately the same size as the bracket 14, and includes a top flange 25 adapted to rest upon the table top. Adjacent the lower edge of the plate a set screw 26 is provided so that the inner face of the templet may be adjusted with respect to the table top to assure proper positioning of the pilot holes for the cap screws 16. The templet is then clamped to the table top so that it cannot slip when drilling the two small pilot holes in the table top flange through openings 27. Two sets of openings are provided to accommodate table top flanges of different heights.

The assembly of the bracket to the table top flange is as follows:

The manner of temporarily mounting the templet has been described above. After the pilot holes have been made in the flange 12, the templet is removed and the two holes for the cap screws are drilled out with a number 3 drill and tapped with a ¼" S.A.E. tap. The bracket 14 is thus applied by first adjusting the set screw 17 so that the bracket face will be square with the table tops and then tightening the two cap screws 16. The extension bars 15 are then screwed firmly in place. The sliding board is then placed on the extension arms and the support is ready for use.

It will be apparent that the device described above describes a rigid support for work to be operated on by the tool. The sliding support provides adjustability and the extension bars are quickly removable and replaceable. It will be understood that while the particular assembly shown has been described in detail and, is well adapted to accomplish the objects of the invention, minor changes in the design of the parts may be made without departing from the spirit of the invention as defined in the appended claims.

Having thus described the invention, what is claimed is:

1. For use on a power-tool work table having a depending flange portion extending angularly below the upper surface of said table, a pair of brackets mounted in spaced relation on said depending flange and including parallel threaded collars projecting laterally from said flange and below the upper surface of said table, a pair of spaced openings in said brackets on opposite sides of said threaded collars, retaining screws extending through said openings and received in threaded bores in said flange, a threaded opening in said brackets below said threaded collars, a set screw received within said threaded opening and abuttingly engaging said depending flange for orienting the threaded collars parallel to the upper surface of said work table, a pair of elongated rods including a threaded end portion removably received in parallel relation in said threaded collars, and a member slidably supported on the upper surface of said rods and including an upper surface portion coplanar with the upper surface of said work table.

2. The structure of claim 1 in which said member includes parallel grooves in the under surface thereof removably receiving said rods therein, preventing lateral movement of said member on said rods and permitting adjustment toward and away from said depending flange.

References Cited in the file of this patent

UNITED STATES PATENTS

| | | |
|---|---|---|
| 103,347 | Lepp | May 24, 1870 |
| 949,119 | Gruender | Feb. 15, 1910 |
| 1,864,840 | Lehner | June 28, 1932 |
| 1,896,924 | Ulrich | Feb. 7, 1933 |
| 2,555,217 | Young | May 29, 1951 |
| 2,697,458 | Cue | Dec. 21, 1954 |
| 2,798,520 | Maskulpa et al. | July 9, 1957 |